United States Patent
Suto et al.

(10) Patent No.: US 10,424,325 B2
(45) Date of Patent: Sep. 24, 2019

(54) MAGNETIC HEAD WITH SPIN TORQUE OSCILLATOR CONNECTION CONFIGURATION

(71) Applicant: KABUSHIKI KAISHA TOSHIBA, Tokyo (JP)

(72) Inventors: Hirofumi Suto, Kanagawa (JP); Kiwamu Kudo, Kanagawa (JP); Tazumi Nagasawa, Kanagawa (JP); Taro Kanao, Kanagawa (JP); Rie Sato, Kanagawa (JP); Koichi Mizushima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/692,197

(22) Filed: Aug. 31, 2017

(65) Prior Publication Data
US 2018/0204589 A1      Jul. 19, 2018

(30) Foreign Application Priority Data

Jan. 13, 2017   (JP) .................. 2017-004040

(51) Int. Cl.
*G11B 5/31*  (2006.01)
*G11B 5/235* (2006.01)
(Continued)

(52) U.S. Cl.
CPC ............ *G11B 5/315* (2013.01); *G11B 5/1278* (2013.01); *G11B 5/235* (2013.01); *G11B 5/314* (2013.01);
(Continued)

(58) Field of Classification Search
None
See application file for complete search history.

(56) References Cited

U.S. PATENT DOCUMENTS

| | | | |
|---|---|---|---|
| 2005/0219771 A1 | 10/2005 | Sato et al. | |
| 2006/0198047 A1* | 9/2006 | Xue et al. | G11B 5/265 360/122 |

(Continued)

FOREIGN PATENT DOCUMENTS

| | | |
|---|---|---|
| JP | 2005-285242 | 10/2005 |
| JP | 2009-80878 A | 4/2009 |

(Continued)

OTHER PUBLICATIONS

Zhu, J., et al., "Microwave Assisted Magnetic Recording", *IEEE Transactions on Magnetics*, vol. 44, No. 1, Jan. 2008, pp. 125-131.

(Continued)

*Primary Examiner* — Craig A. Renner
(74) *Attorney, Agent, or Firm* — Finnegan, Henderson, Farabow, Garrett & Dunner, L.L.P.

(57) ABSTRACT

According to one embodiment, a magnetic head includes a first magnetic layer, a second magnetic layer, an intermediate layer, a magnetic pole, a first terminal, and a second terminal. The second magnetic layer is separated from the first magnetic layer in a first direction. The intermediate layer is provided between the first magnetic layer and the second magnetic layer. A second direction from the first magnetic layer toward the magnetic pole crosses the first direction. The first terminal is electrically connected to the intermediate layer. The second terminal is electrically connected to the second magnetic layer.

15 Claims, 10 Drawing Sheets

(51) Int. Cl.
   *G11B 5/127* (2006.01)
   *G11B 5/00* (2006.01)

(52) U.S. Cl.
   CPC .......... *G11B 5/3133* (2013.01); *G11B 5/3146* (2013.01); *G11B 2005/0024* (2013.01)

(56) References Cited

U.S. PATENT DOCUMENTS

| | | |
|---|---|---|
| 2008/0304176 A1 | 12/2008 | Takagishi et al. |
| 2009/0052095 A1* | 2/2009 | Yamada et al. ...... G11B 5/3133 360/324 |
| 2009/0080105 A1* | 3/2009 | Takashita et al. ..... G11B 5/314 360/125.04 |
| 2009/0080106 A1* | 3/2009 | Shimizu et al. ....... G11B 5/314 360/125.03 |
| 2011/0179858 A1 | 7/2011 | Mais et al. |
| 2012/0154952 A1 | 6/2012 | Yamada et al. |
| 2012/0307404 A1* | 12/2012 | Braganca et al. ... G11B 5/3903 360/245.8 |
| 2013/0028058 A1 | 1/2013 | Yasui et al. |
| 2016/0027455 A1 | 1/2016 | Kudo et al. |
| 2016/0180867 A1* | 6/2016 | Takagishi et al. ..... G11B 5/314 360/123.01 |
| 2016/0180906 A1 | 6/2016 | Kudo et al. |

FOREIGN PATENT DOCUMENTS

| | | |
|---|---|---|
| JP | 2009-099248 | 5/2009 |
| JP | 2009-163871 A | 7/2009 |
| JP | 2010-225230 | 10/2010 |
| JP | 2011-530707 | 12/2011 |
| JP | 2014-149911 A | 8/2014 |
| JP | 2016-029603 | 3/2016 |
| JP | 2016-119132 A | 6/2016 |
| JP | 2016-119136 | 6/2016 |
| WO | WO 2011/027396 | 3/2011 |
| WO | WO 2011/132503 A1 | 10/2011 |

OTHER PUBLICATIONS

Suto, H., et al., Layer-Selective Switching of a Double-Layer Perpendicular Magnetic Naricdot Using Microwave Assistance, *Physical Review Applied 5,* 2016, pp. 014003-1 thru 014003-3.

* cited by examiner

MAGNETIC HEAD WITH SPIN TORQUE OSCILLATOR CONNECTION CONFIGURATION

CROSS-REFERENCE TO RELATED APPLICATIONS

This application is based upon and claims the benefit of priority from Japanese Patent Application No. 2017-004040, filed on Jan. 13, 2017; the entire contents of which are incorporated herein by reference.

FIELD

Embodiments described herein relate generally to a magnetic head and a magnetic recording and reproducing device.

BACKGROUND

In a magnetic recording and reproducing device that uses a magnetic recording medium such as a magnetic disk, etc., the recording to and reproducing from the magnetic recording medium is performed by a magnetic head. It is desirable to increase the recording density.

DETAILED DESCRIPTION

Figure 1A:
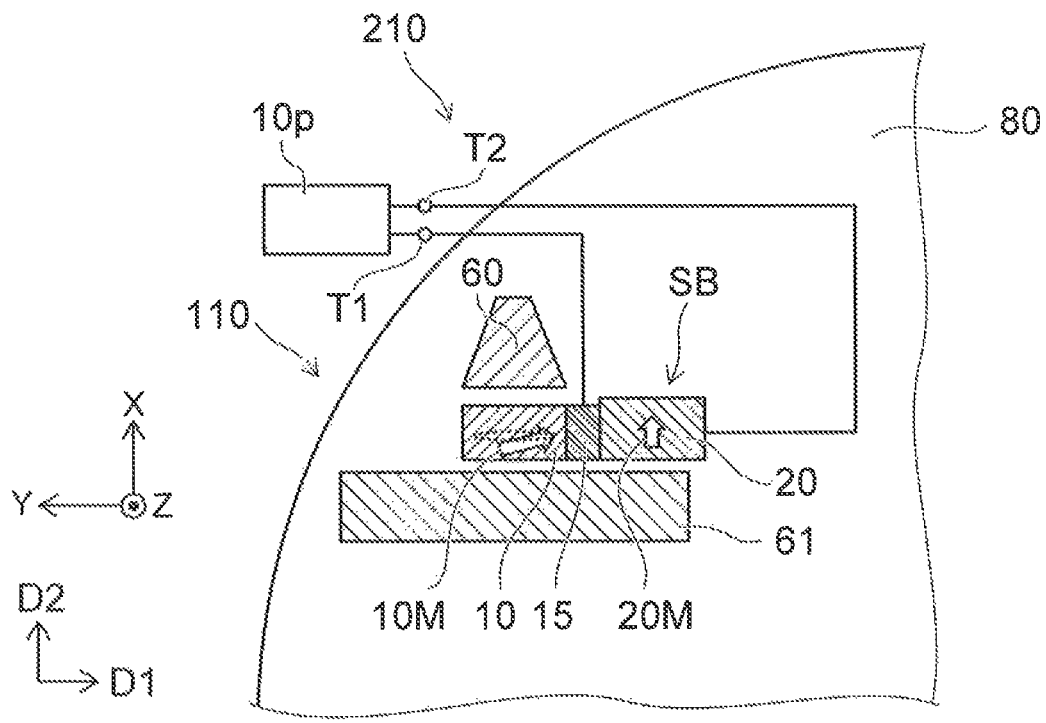
FIG. 1A and FIG. 1B are schematic views illustrating a magnetic head and a magnetic recording and reproducing device according to the first embodiment.

According to one embodiment, a magnetic head includes a first magnetic layer, a second magnetic layer, an intermediate layer, a magnetic pole, a first terminal, and a second terminal. The second magnetic layer is separated from the first magnetic layer in a first direction. The intermediate layer is provided between the first magnetic layer and the second magnetic layer. A second direction from the first magnetic layer toward the magnetic pole crosses the first direction. The first terminal is electrically connected to the intermediate layer. The second terminal is electrically connected to the second magnetic layer.

According to another embodiment, a magnetic recording and reproducing device includes the magnetic head described above, and a magnetic recording medium.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
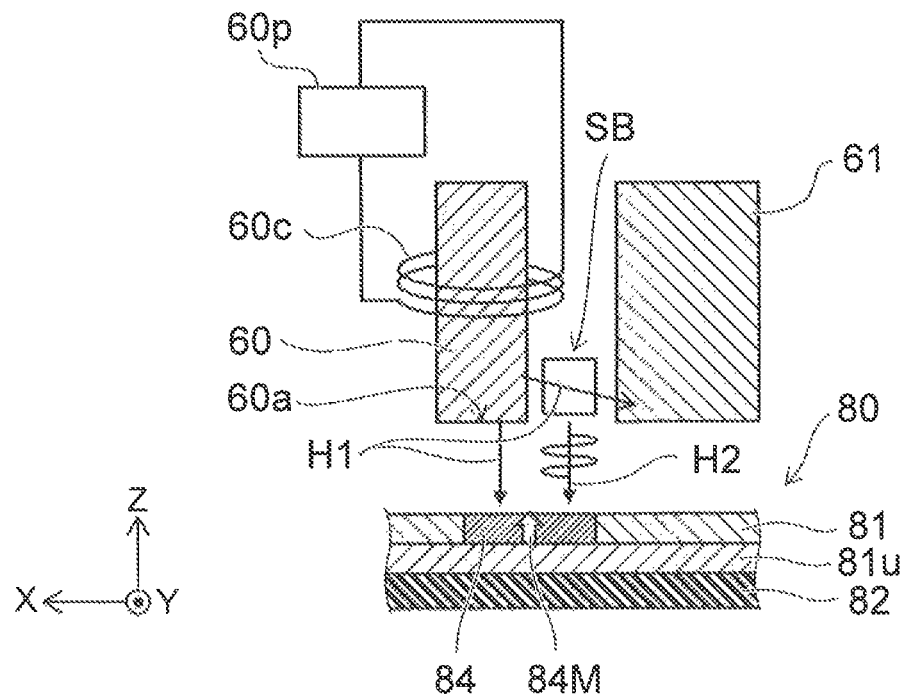

FIG. 1A and FIG. 1B are schematic views illustrating a magnetic head and a magnetic recording and reproducing device according to the first embodiment.

FIG. 1A is a schematic plan view. FIG. 1B is a schematic cross-sectional view. At least a portion of the insulating portions, etc., are not illustrated in these drawings and in subsequent drawings.

As shown in FIG. 1A, the magnetic recording and reproducing device 210 includes the magnetic head 110 and a magnetic recording medium 80. The magnetic head 110 records and reproduces information to and from the magnetic recording medium 80.

The magnetic head 110 includes a stacked body SB, a magnetic pole 60, a first terminal T1, and a second terminal T2.

The stacked body SB includes a first magnetic layer 10, a second magnetic layer 20, and an intermediate layer 15.

The second magnetic layer 20 is separated from the first magnetic layer 10 in a first direction D1. The intermediate layer 15 is provided between the first magnetic layer 10 and the second magnetic layer 20.

A first magnetization 10M of the first magnetic layer 10 is, for example, rotatable. The first magnetic layer 10 is, for example, an oscillation generation layer. A second magnetization 20M of the second magnetic layer 20 does not change easily compared to the first magnetization 10M. The second magnetic layer 20 is, for example, a spin injection layer.

Examples of the materials of the first magnetic layer 10, the second magnetic layer 20, and the intermediate layer 15 are described below.

The magnetic pole 60 is, for example, a main pole. A second direction D2 from the first magnetic layer 10 toward the magnetic pole 60 crosses the first direction D1.

The first terminal T1 is electrically connected to the intermediate layer 15. The second terminal T2 is electrically connected to the second magnetic layer 20.

For example, the stacked body SB that includes the first magnetic layer 10, the intermediate layer 15, and the second magnetic layer 20 generates an oscillating magnetic field when a current flows between the first terminal T1 and the second terminal T2. The oscillating magnetic field is, for example, a high frequency magnetic field. The frequency of the oscillating magnetic field is, for example, not less than 1 GHz and not more than 50 GHz. The stacked body SB functions as, for example, a spin torque oscillator.

In the example, the magnetic head 110 further includes a first shield 61. The first magnetic layer 10 is positioned between the magnetic pole 60 and the first shield 61 in the second direction D2. The first shield 61 is, for example, a trailing shield.

A direction perpendicular to the upper surface of the magnetic recording medium 80 is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is the down-track direction. The Y-axis direction is the cross-track direction.

The first direction D1 and the second direction D2 cross the Z-axis direction. For example, the first direction D1 is aligned with the cross-track direction. For example, the second direction D2 is aligned with the down-track direction.

As shown in FIG. 1B, the magnetic pole 60 has a medium-opposing surface 60a (air bearing surface, for example). The medium-opposing surface 60a opposes the magnetic recording medium 80. For example, the medium-opposing surface 60a corresponds to the air bearing surface.

The magnetic recording medium 80 includes a recording layer 81. In the example, the magnetic recording medium 80 further includes a medium substrate 82 and a medium under layer 81u. The recording layer 81 is positioned between the medium substrate 82 and the magnetic head 110. The medium under layer 81u is positioned between the medium substrate 82 and the recording layer 81. The recording layer 81, the medium under layer 81u, and the medium substrate 82 are stacked along the Z-axis direction. As described below, the recording layer 81 may include multiple magnetic recording films stacked along the Z-axis direction.

A portion of the recording layer 81 is used as one recording bit 84. The orientation of the magnetization (a recording bit magnetization 84M) of the recording bit 84 is substantially aligned with, for example, the Z-axis direction. The magnetic recording medium 80 is, for example, a perpendicular magnetic recording medium. The orientation of the recording bit magnetization 84M is controlled by the magnetic head 110; and information is recorded.

A coil 60c is provided in the magnetic head 110. At least a portion of the coil 60c is provided in at least a portion of a region around the magnetic pole 60. A first magnetic field H1 is generated from the magnetic pole 60 by a current (a recording current) flowing in the coil 60c. The orientation of the recording bit magnetization 84M is changed by the first magnetic field H1 being applied to the magnetic recording medium 80.

In the example, a first circuit portion 10p and a second circuit portion 60p are provided in the magnetic recording and reproducing device 210. The second circuit portion 60p is configured to supply the current (the recording current) to the coil 60c. The first magnetic field H1 (the recording magnetic field) is generated from the magnetic pole 60 by the recording current. The first magnetic field H1 is applied to the recording bit 84.

On the other hand, the first circuit portion 10p is configured to supply a current to the first terminal T1 and the second terminal T2. A current flows between the intermediate layer 15 and the second magnetic layer 20 due to this current. Thereby, a second magnetic field H2 is generated from the stacked body SB. The second magnetic field H2 is an oscillating magnetic field (a high frequency magnetic field). The second magnetic field H2 also is applied to the recording bit 84. The recording bit magnetization 84M of the magnetic recording medium 80 is changed more easily due to the second magnetic field H2. For example, high frequency assisted writing is performed. Thereby, the recording of the desired information is possible even if the anisotropy of the magnetic recording medium 80 is high.

In the embodiment, the second magnetic field H2 (the high frequency magnetic field) is generated by the current flowing between the intermediate layer 15 and the second magnetic layer 20.

Generally, it is considered that a high frequency magnetic field is generated in an oscillation generation layer by a current (an electron current) flowing between the oscillation generation layer and a spin injection layer.

Conversely, in the embodiment, it is considered that a current flows between the intermediate layer 15 and the second magnetic layer 20; but a current substantially does not flow in the first magnetic layer 10. It is considered that the high frequency magnetic field is generated in this state because, for example, the spin spreads from the second magnetic layer 20 side toward the first magnetic layer 10. Thereby, it is considered that rotational motion of the first magnetization 10M of the first magnetic layer 10 occurs. Thereby, it is considered that the second magnetic field H2 (the high frequency magnetic field) is generated from the first magnetic layer 10 (the stacked body SB).

In the embodiment, an electrode for causing the current to flow may not be provided at the first magnetic layer 10 provided between the magnetic pole 60 and the first shield 61. Therefore, the spacing (the recording gap) between the magnetic pole 60 and the first shield 61 can be small. Thereby, a higher recording density is possible.

In the example as shown in FIG. 1A, the second magnetic layer 20 does not overlap the magnetic pole 60 in the second direction D2. The intermediate layer 15 does not overlap the magnetic pole 60 in the second direction D2. Thereby, for example, the spacing between the magnetic pole 60 and the first shield 61 can be even smaller. The recording density can be increased further.

Thus, in the embodiment, at least a portion of the second magnetic layer 20 may not overlap the magnetic pole 60 in the second direction D2. At least a portion of the intermediate layer 15 may not overlap the magnetic pole 60 in the second direction D2.

In the example, the first direction D1 and the second direction D2 are aligned with the medium-opposing surface 60a (e.g., the X-Y plane). As described below, in the embodiment, the first direction D1 may cross the medium-opposing surface 60a.

In the embodiment, at least one of the surface of the first magnetic layer 10 opposing the intermediate layer 15 or the surface of the second magnetic layer 20 opposing the intermediate layer 15 may be tilted with respect to the second direction D2. At least one of these surfaces may be tilted with respect to the first direction D1.

The first magnetic layer 10 includes, for example, at least one selected from the group consisting of NiFe and CoFe. Films of these materials are, for example, in-plane magnetization films. The saturation magnetization of these materials is high. For example, a large high frequency magnetic field can be generated when oscillating.

The first magnetic layer 10 may have, for example, a negative uniaxial magnetic anisotropy. The axis of the uniaxial magnetic anisotropy is aligned with, for example, the second direction D2. For example, the magnetization oscillation is stable. The film that has the negative uniaxial magnetic anisotropy includes, for example, a multilayer film of Co/Fe.

The first magnetic layer 10 may include, for example, at least one selected from the group consisting of Al, Si, and B. The first magnetic layer 10 may include a layer of multiple stacked materials. For example, at least one of the anisotropic magnetic field or the saturation magnetic flux density is adjusted.

The thickness (the length along the first direction D1) of the first magnetic layer 10 is, for example, not less than 2 nm and not more than 40 nm. The thickness may be, for example, not less than 8 nm and not more than 20 nm. For example, the second magnetic field H2 (the high frequency magnetic field) having a high field amplitude is obtained.

The second magnetic layer 20 includes, for example, a Pt-based magnetic material. The Pt-based magnetic material includes, for example, at least one selected from the group consisting of CoPt and FePt. In the magnetic material, the second magnetization 20M of the second magnetic layer 20 has an easy axis along, for example, the first direction D1.

The second magnetic layer 20 may include, for example, a CoCr-based magnetic material. The second magnetic layer 20 may include, for example, a rare-earth element-based magnetic material. The rare-earth element-based magnetic material includes, for example, at least one selected from the group consisting of TbFe and TbCo.

The second magnetic layer 20 may include, for example, a Heusler alloy. The Heusler alloy includes, for example, at least one selected from the group consisting of $Co_2MnSi$, $Co_2Fe(Al_{0.5}Si_{0.5})$, $Co_2(Fe_{0.4}Mn)Si$, and $Co_2Fe(Ga_{0.5}Ge_{0.5})$. A high spin injection efficiency is obtained for these materials.

The second magnetic layer 20 may include, for example, a layer of multiple stacked materials. In the case where the second magnetic layer 20 includes multiple magnetic films, a film (e.g., a Ru film) of a material causing antiferromagnetic coupling to occur may be provided between the multiple magnetic films. The second magnetic layer 20 may include multiple magnetic films coupled antiferromagnetically. By using the antiferromagnetic coupling, for example, the magnetic volume of the spin injection layer is large. By using the antiferromagnetic coupling, for example, the leakage magnetic field can be reduced.

For example, the thickness (the length along the first direction D1) of the second magnetic layer 20 may be, for example, thicker than the thickness (the length along the first direction D1) of the first magnetic layer 10. For example, the spin-transfer efficiency increases. In the case where the second magnetic layer 20 is thick, for example, the second magnetization 20M of the second magnetic layer 20 is stable.

The thickness (the length along the first direction D1) of the second magnetic layer 20 is, for example, not less than 2 nm and not more than 40 nm. The thickness may be, for example, not less than 5 nm and not more than 20 nm. For example, high stability of the second magnetization 20M is obtained.

The intermediate layer 15 includes, for example, at least one selected from the group consisting of Cu and Ag. For example, a high spin-transfer efficiency is obtained for these materials. In the case where the thickness (the length along the first direction D1) of the intermediate layer 15 is excessively thin, for example, the second magnetic layer 20 and the first magnetic layer 10 are coupled magnetically; and negative effects on the oscillation occur. In the case where the thickness of the intermediate layer 15 is excessively thick, for example, the efficiency of the spin transfer decreases. The thickness of the intermediate layer 15 is, for example, not less than 2 nm and not more than 15 nm. The thickness of the intermediate layer 15 may be not less than 3 nm and not more than 10 nm.

An example of a method for manufacturing the magnetic head 110 will now be described.

FIG. 2A to FIG. 2F are schematic cross-sectional views illustrating the method for manufacturing the magnetic head according to the first embodiment.

Figure 2A:
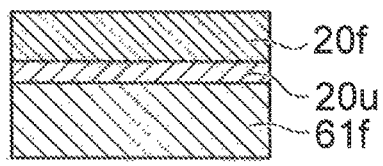
FIG. 2A to FIG. 2F are schematic cross-sectional views illustrating the method for manufacturing the magnetic head according to the first embodiment.

As shown in FIG. 2A, a under film 20u is formed on a first shield film 61f used to form the first shield 61. A second magnetic film 20f that is used to form the second magnetic layer 20 is formed on the under film 20u. For example, the under film 20u substantially breaks the magnetic coupling between the second magnetic layer 20 and the first shield 61.

Figure 2B:
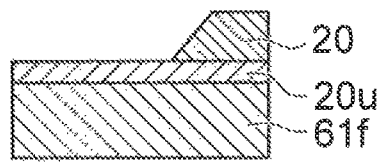

As shown in FIG. 2B, a portion of the second magnetic film 20f is removed. The upper surface of the under film 20u is exposed. The second magnetic layer 20 is formed.

Figure 2C:
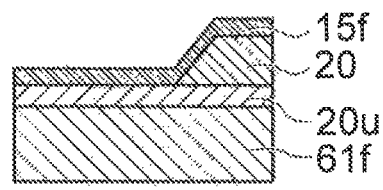

As shown in FIG. 2C, an intermediate film 15f that is used to form the intermediate layer 15 is formed on the second magnetic layer 20 and on the exposed under film 20u.

Figure 2D:
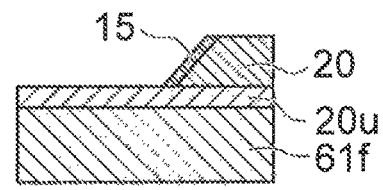

As shown in FIG. 2D, a portion of the intermediate film 15f is removed. The intermediate film 15f that is provided on the side wall of the second magnetic film 20f remains. The intermediate layer 15 is formed. The upper surface of the second magnetic layer 20 and a portion of the upper surface of the under film 20u are exposed.

Figure 2E:
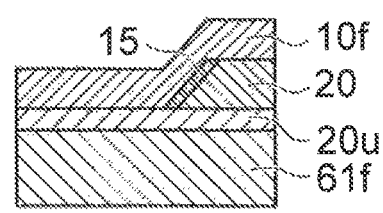

As shown in FIG. 2E, a first magnetic film 10f that is used to form the first magnetic layer 10 is formed on the intermediate layer 15, the upper surface of the second magnetic layer 20, and the portion of the upper surface of the under film 20u recited above.

Figure 2F:
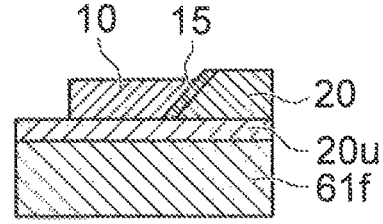

The first magnetic film 10f is patterned as shown in FIG. 2F. Thereby, the first magnetic layer 10 is formed.

Subsequently, a prescribed insulating film is formed. A film that is used to form the magnetic pole 60 is formed; and the film is patterned. Thereby, the magnetic pole 60 is obtained.

Thus, the magnetic head 110 is obtained. An insulating material may be used as the under film 20u recited above.

Figure 3:
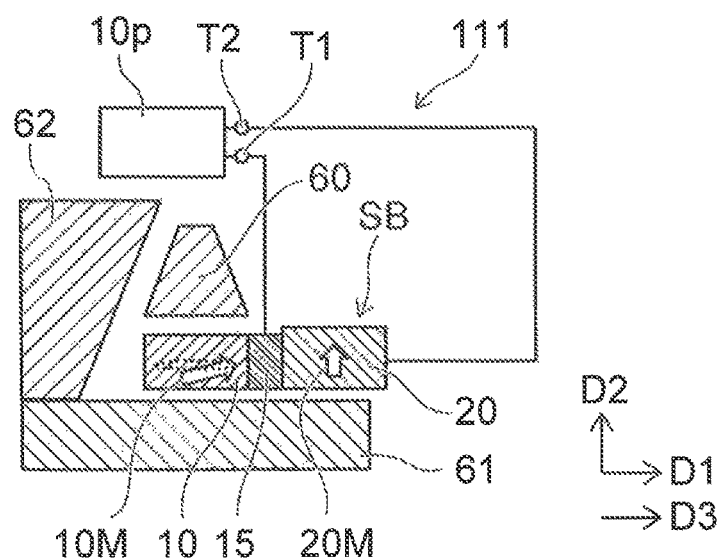
FIG. 3 is a schematic plan view illustrating another magnetic head according to the first embodiment.

FIG. 3 is a schematic plan view illustrating another magnetic head according to the first embodiment.

In the other magnetic head 111 according to the embodiment as shown in FIG. 3, a second shield 62 is further provided in addition to the stacked body SB, the magnetic pole 60, the first shield 61, the first terminal T1, and the second terminal T2. Otherwise, the configuration of the magnetic head 111 is similar to that of the magnetic head 110.

A third direction D3 from the second shield 62 toward the first magnetic layer 10 crosses the second direction D2. In the example, the third direction D3 is aligned with the first direction D1. The second shield 62 is, for example, a side shield. By providing the second shield 62, for example, the density of the magnetic field (the first magnetic field H1) generated from the magnetic pole 60 can be high. The end portion of the first magnetic field H1 can be sharp. The recording density can be increased further.

Figure 4:
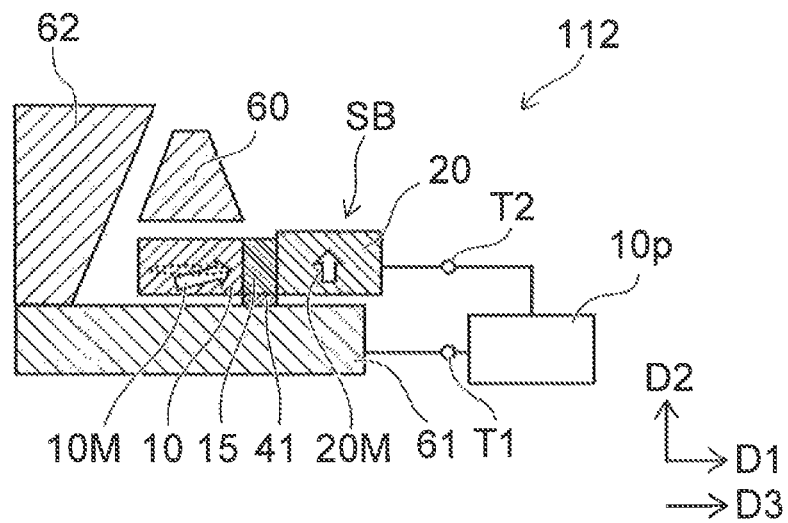
FIG. 4 is a schematic plan view illustrating another magnetic head according to the first embodiment.

FIG. 4 is a schematic plan view illustrating another magnetic head according to the first embodiment.

In the other magnetic head 112 according to the embodiment as shown in FIG. 4, a first conductive layer 41 is further provided in addition to the stacked body SB, the magnetic pole 60, the first shield 61, the first terminal T1, the second terminal T2, and the second shield 62. Otherwise, the configuration of the magnetic head 112 is similar to that of the magnetic head 111.

The first conductive layer 41 is provided between the first shield 61 and the intermediate layer 15. In the example, the first conductive layer 41 is provided between the first shield 61 and the intermediate layer 15 in the second direction D2. The first conductive layer 41 is electrically connected to the first shield 61 and the intermediate layer 15. Thus, the first shield 61 is electrically connected to the intermediate layer 15. The first terminal T1 is electrically connected to the first shield 61. The first circuit portion 10p supplies the current between the intermediate layer 15 and the second magnetic layer 20 via the first terminal T1 and the second terminal T2.

Figure 5:
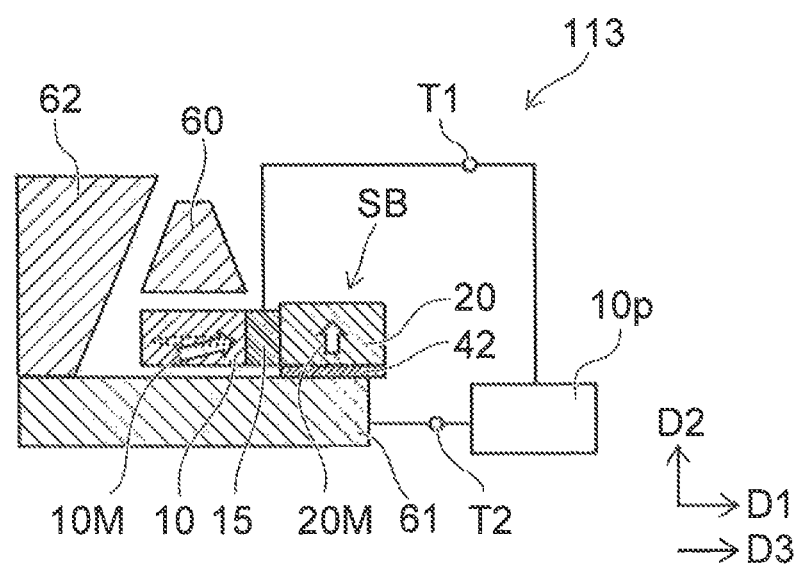
FIG. 5 is a schematic plan view illustrating another magnetic head according to the first embodiment.

FIG. 5 is a schematic plan view illustrating another magnetic head according to the first embodiment.

In the other magnetic head 113 according to the embodiment as shown in FIG. 5, a second conductive layer 42 is further provided in addition to the stacked body SB, the magnetic pole 60, the first shield 61, the first terminal T1, the second terminal T2, and the second shield 62. Otherwise, the configuration of the magnetic head 113 is similar to that of the magnetic head 111.

The second conductive layer 42 is provided between the first shield 61 and the second magnetic layer 20. In the example, the second conductive layer 42 is provided between the first shield 61 and the second magnetic layer 20 in the second direction D2. The second conductive layer 42 is electrically connected to the first shield 61 and the second magnetic layer 20. The second terminal T2 is electrically connected to the first shield 61. The first circuit portion 10p supplies the current between the intermediate layer 15 and the second magnetic layer 20 via the first terminal T1 and the second terminal T2.

Figure 6:
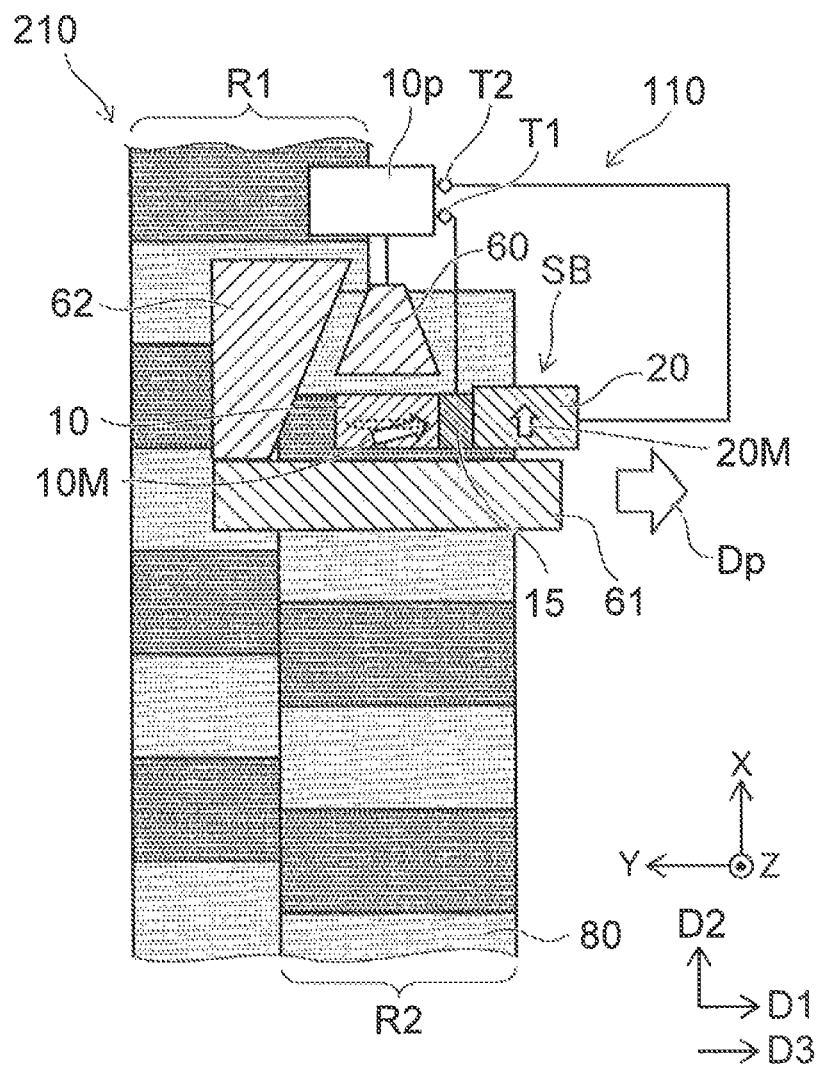
FIG. 6 is a schematic plan view illustrating a magnetic recording and reproducing device that uses the magnetic head according to the first embodiment.

FIG. 6 is a schematic plan view illustrating a magnetic recording and reproducing device that uses the magnetic head according to the first embodiment.

In FIG. 6, the magnetic recording medium 80 and the magnetic head (in the example, the magnetic head 110) according to the embodiment are provided in the magnetic recording and reproducing device 210. The magnetic head 110 moves relative to the magnetic recording medium 80 along a progressive scan direction Dp. For example, the progressive scan direction Dp is aligned with the cross-track direction.

For example, "shingled recording" may be performed in the magnetic recording and reproducing device 210. In such a case, the side where the second shield 62 (the side shield) is provided is at the rearward position in the progressive scan direction Dp.

For example, the magnetic pole 60 performs the recording in a first region R1 of the magnetic recording medium 80; subsequently, the magnetic pole 60 performs the recording in a second region R2 of the magnetic recording medium 80. For example, a portion of the second region R2 overlaps the first region R1.

The magnetic pole 60 opposes the first region R1 when the magnetic pole 60 performs the recording to the first region R1 of the magnetic recording medium 80. The magnetic pole 60 opposes the second region R2 when the magnetic pole 60 performs the recording to the second region R2 of the magnetic recording medium 80. The second shield 62 opposes at least a portion of the first region R1 when the magnetic pole 60 performs the recording to the second region R2 of the magnetic recording medium 80.

Because the second shield 62 is provided, the change of the density of the recording magnetic field (the first magnetic field H1) is abrupt on the second shield 62 side. Thereby, the recording density in the cross-track direction can be increased further.

Figure 7A:
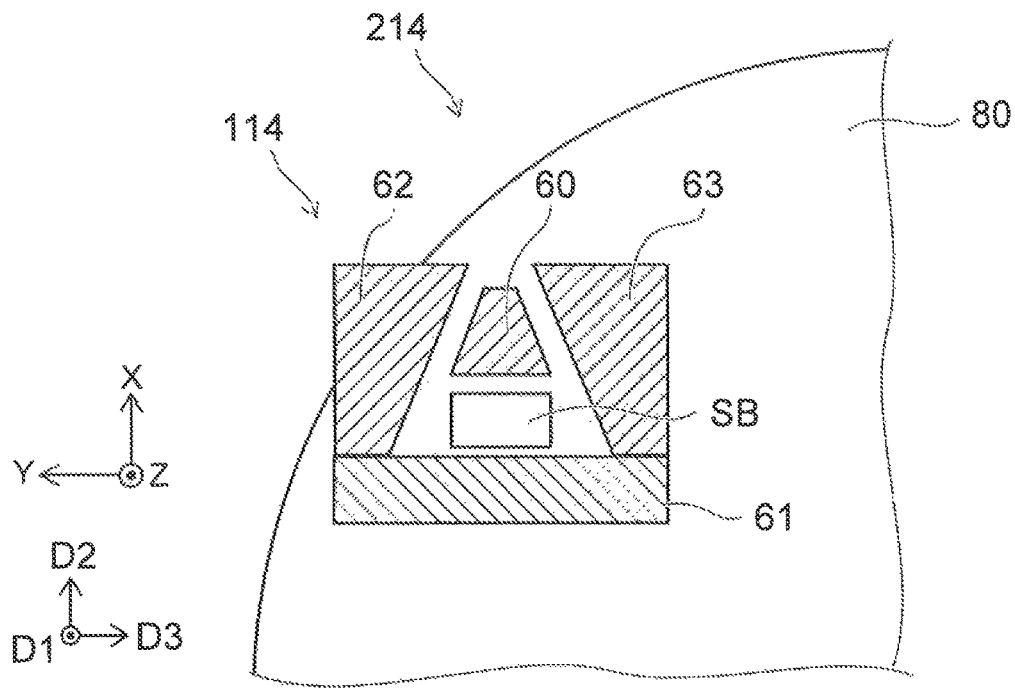
FIG. 7A and FIG. 7B are schematic views illustrating another magnetic head and another magnetic recording and reproducing device according to the first embodiment.
Figure 7B:
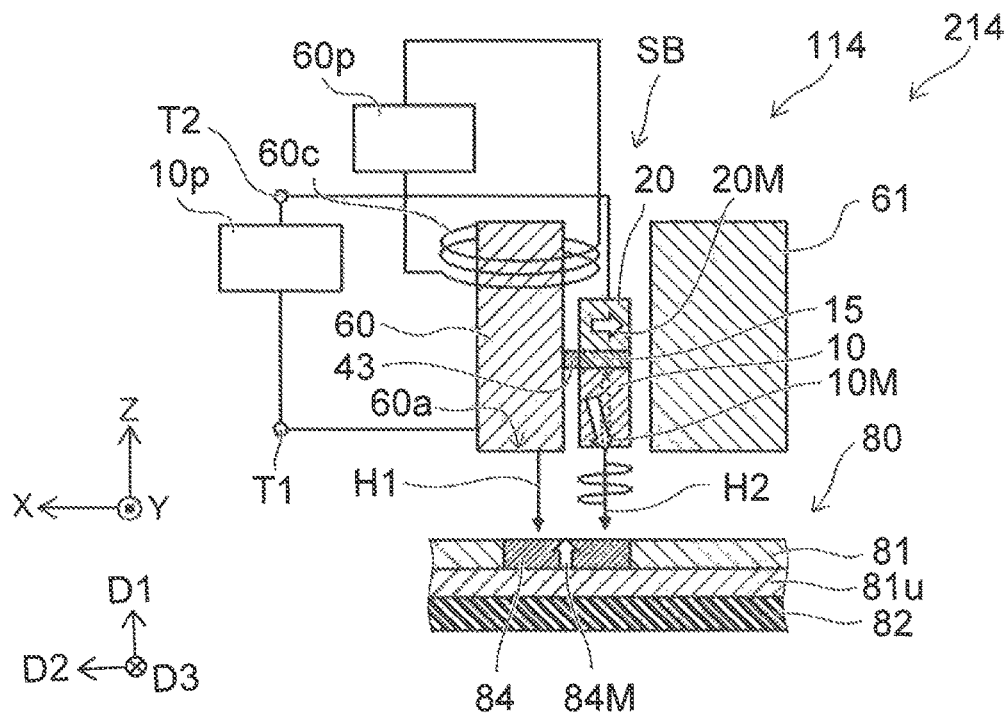
Figure 8:
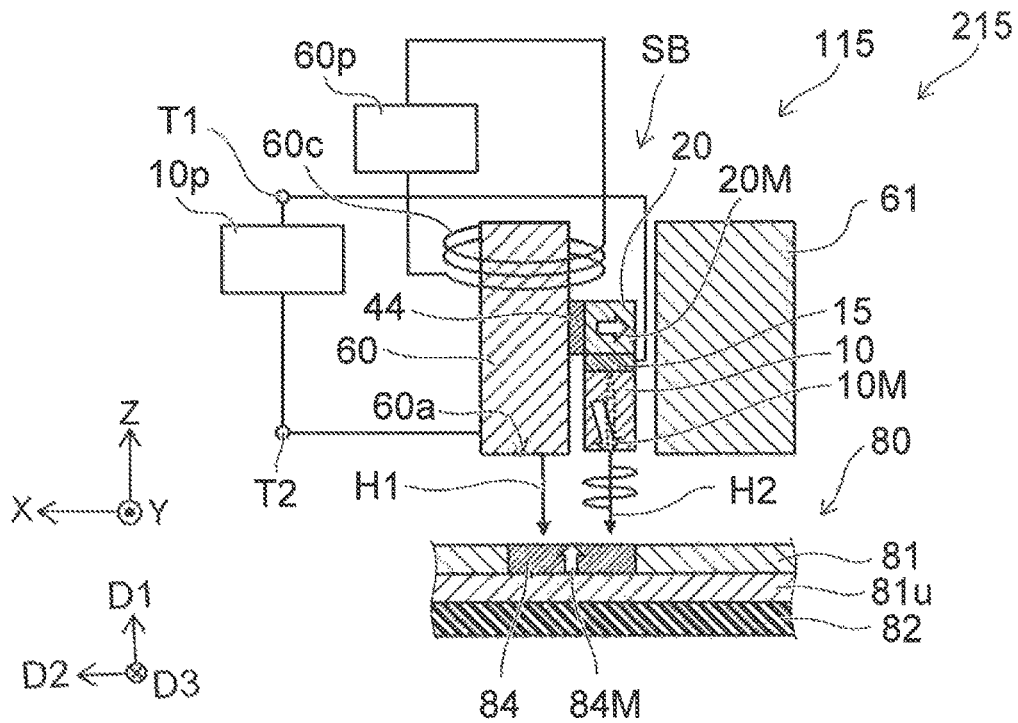
FIG. 8 is a schematic cross-sectional view illustrating another magnetic head and magnetic recording and reproducing device according to the first embodiment.
Figure 9:
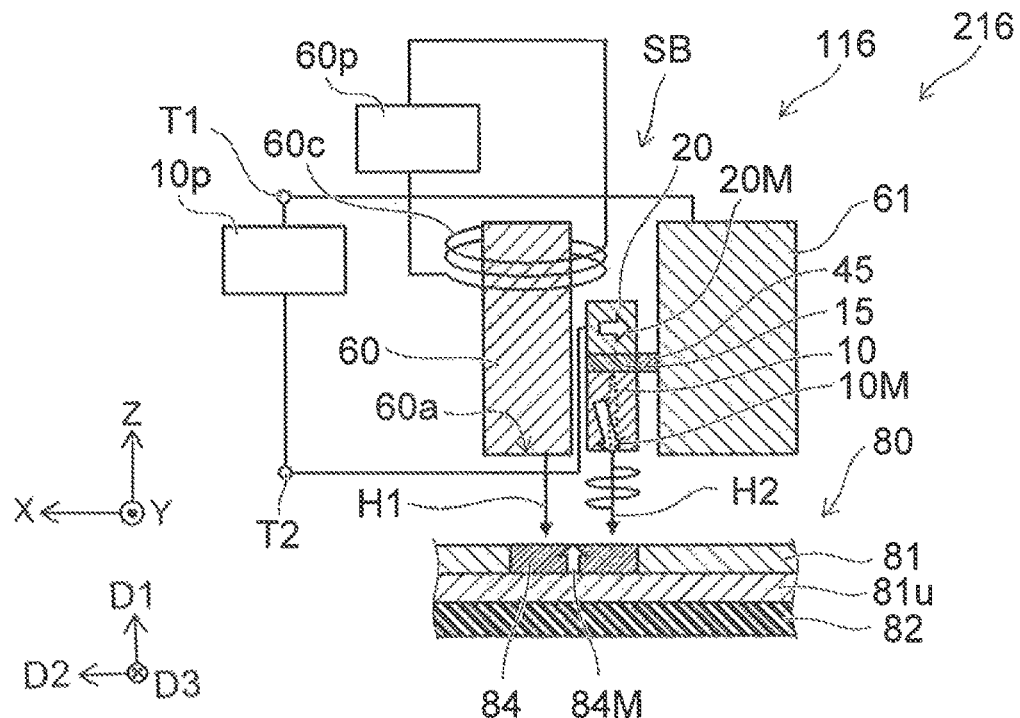
FIG. 9 is a schematic cross-sectional view illustrating another magnetic head and magnetic recording and reproducing device according to the first embodiment.
Figure 10:
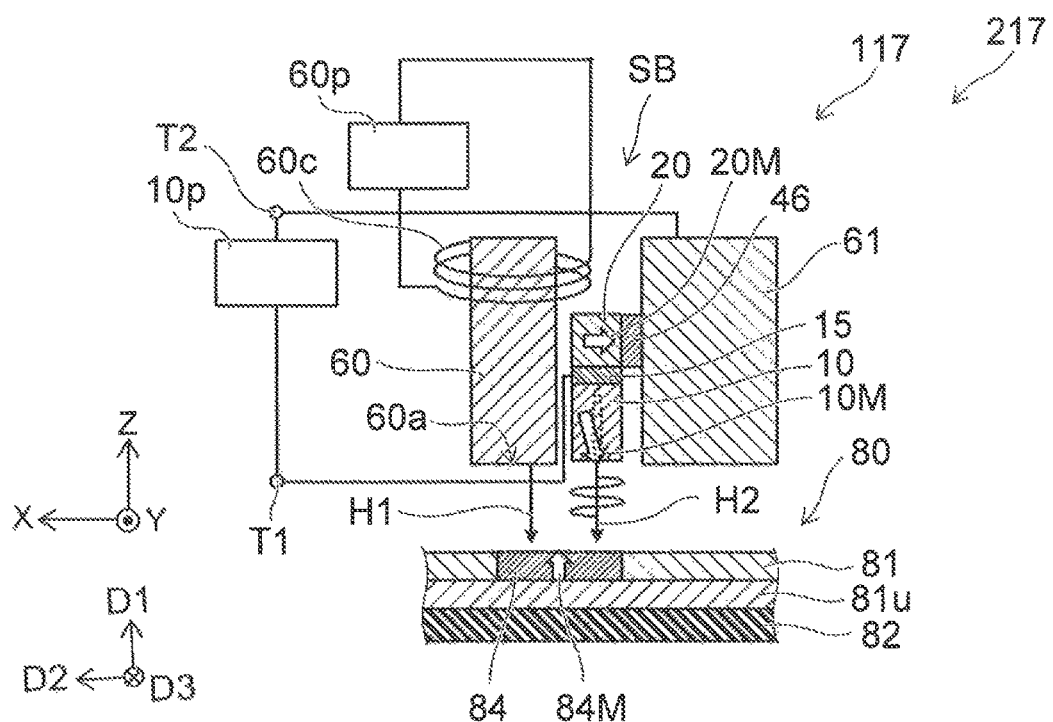
FIG. 10 is a schematic cross-sectional view illustrating another magnetic head and magnetic recording and reproducing device according to the first embodiment.
Figure 11:
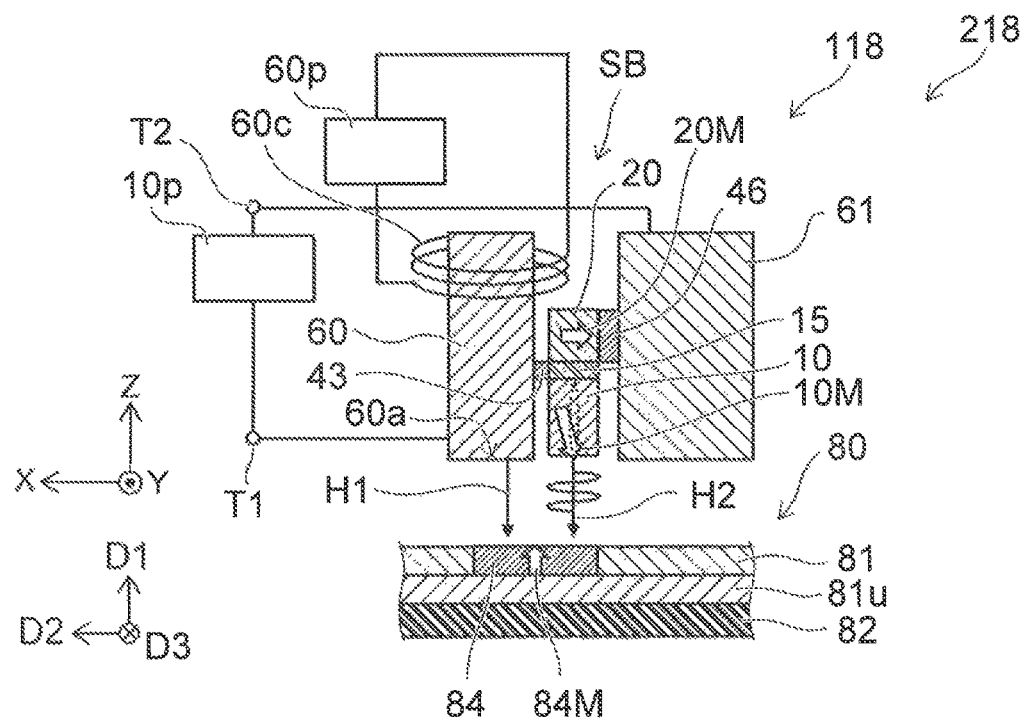
FIG. 11 is a schematic cross-sectional view illustrating another magnetic head and magnetic recording and reproducing device according to the first embodiment.

FIG. 7A and FIG. 7B are schematic views illustrating another magnetic head and another magnetic recording and reproducing device according to the first embodiment.

FIG. 7A is a schematic plan view. FIG. 7B is a schematic cross-sectional view.

As shown in FIG. 7A, the magnetic recording and reproducing device 214 includes the magnetic head 114 and the magnetic recording medium 80.

The magnetic head 114 also includes the stacked body SB, the magnetic pole 60, the first terminal T1, and the second terminal T2. The first shield 61, the second shield 62, and a third shield 63 are provided in the example. In the magnetic head 114 as well, the stacked body SB includes the first magnetic layer 10, the second magnetic layer 20, and the intermediate layer 15.

In the magnetic head 114 as shown in FIG. 7B, the first direction D1 from the first magnetic layer 10 toward the second magnetic layer 20 is aligned with the Z-axis direction (the height direction). The second direction D2 from the first magnetic layer 10 toward the magnetic pole 60 is aligned with the X-Y plane.

For example, the magnetic pole 60 has the medium-opposing surface 60a. The first direction D1 crosses a plane (the X-Y plane) including the medium-opposing surface 60a. The second direction D2 is aligned with the medium-opposing surface 60a.

In the example, at least a portion of the second magnetic layer 20 overlaps the magnetic pole 60 in the second direction D2. At least a portion of the intermediate layer 15 overlaps the magnetic pole 60 in the second direction D2.

The first magnetic layer 10 is positioned between the magnetic pole 60 and the first shield 61 in the second direction D2. The first shield 61 is, for example, a trailing shield.

As shown in FIG. 7A, the third direction D3 from the second shield 62 toward the first magnetic layer 10 crosses the second direction D2. The third direction D3 crosses a plane (e.g., the Z-X plane) formed by the first direction D1 and the second direction D2.

The stacked body SB (the first magnetic layer 10, the second magnetic layer 20, and the intermediate layer 15) is positioned between the second shield 62 and the third shield 63 in the third direction D3.

In the magnetic head 114 as well, the stacked body SB generates the second magnetic field H2 (an oscillating magnetic field, e.g., a high frequency magnetic field) when a current flows between the first terminal T1 and the second terminal T2.

For example, the first circuit portion 10p is provided in the magnetic recording and reproducing device 214. The first circuit portion 10p supplies the current recited above to the stacked body SB via the first terminal T1 and the second terminal T2. The second circuit portion 60p is provided in the magnetic recording and reproducing device 214. A current (the recording current) is supplied to the coil 60c around the magnetic pole 60 from the second circuit portion 60p. The first magnetic field H1 (the recording magnetic field) is generated. The recording to the magnetic recording medium 80 by the first magnetic field H1 is assisted by the second magnetic field H2.

According to the magnetic head 114 and the magnetic recording and reproducing device 214, a high recording density is obtained.

As shown in FIG. 7B, a third conductive layer 43 is provided in the magnetic head 114. In the example, the third conductive layer 43 is provided between the magnetic pole 60 and the intermediate layer 15. The third conductive layer 43 is electrically connected to the magnetic pole 60 and the intermediate layer 15. The first terminal T1 is electrically connected to the magnetic pole 60. The second terminal T2 is electrically connected to the second magnetic layer 20.

FIG. 8 to FIG. 11 are schematic cross-sectional views illustrating other magnetic heads and magnetic recording and reproducing devices according to the first embodiment.

As shown in FIG. 8 to FIG. 11, the magnetic recording and reproducing devices 215 to 218 include the magnetic recording medium 80 and respectively include the magnetic heads 115 to 118.

The magnetic heads 115 to 118 also include the stacked body SB, the magnetic pole 60, the first terminal T1, and the second terminal T2. The first shield 61 is provided in the example. The second shield 62 and the third shield 63 may be further provided. In the magnetic heads 115 to 118 as well, the stacked body SB includes the first magnetic layer 10, the second magnetic layer 20, and the intermediate layer 15.

The magnetic head 115 further includes a fourth conductive layer 44. In the example, the fourth conductive layer 44 is provided between the magnetic pole 60 and the second magnetic layer 20. The fourth conductive layer 44 is electrically connected to the magnetic pole 60 and the second magnetic layer 20. The first terminal T1 is electrically connected to the intermediate layer 15. The second terminal T2 is electrically connected to the magnetic pole 60.

In the magnetic head 116, the first magnetic layer 10 is positioned between the magnetic pole 60 and the first shield 61 in the second direction D2. The magnetic head 116 further includes a fifth conductive layer 45. In the example, the fifth conductive layer 45 is provided between the first shield 61 and the intermediate layer 15. The fifth conductive layer 45 is electrically connected to the first shield 61 and the intermediate layer 15. The first terminal T1 is electrically connected to the first shield 61. The second terminal T2 is electrically connected to the second magnetic layer 20.

In the magnetic head 117, the first magnetic layer 10 is positioned between the magnetic pole 60 and the first shield 61 in the second direction D2. The magnetic head 117 further includes a sixth conductive layer 46. In the example, the sixth conductive layer 46 is provided between the first shield 61 and the second magnetic layer 20. The sixth conductive layer 46 is electrically connected to the first shield 61 and the second magnetic layer 20. The first terminal T1 is electrically connected to the intermediate layer 15. The second terminal T2 is electrically connected to the first shield 61.

The third conductive layer 43 and the sixth conductive layer 46 are provided in the magnetic head 118. The third conductive layer 43 is provided between the magnetic pole 60 and the intermediate layer 15 and electrically connected to the magnetic pole 60 and the intermediate layer 15. The sixth conductive layer 46 is provided between the first shield 61 and the second magnetic layer 20 and electrically connected to the first shield 61 and the second magnetic layer 20. The first terminal T1 is electrically connected to the magnetic pole 60. The second terminal T2 is electrically connected to the first shield 61.

In the magnetic heads 115 to 118 and the magnetic recording and reproducing devices 215 to 218 as well, a high recording density is obtained.

Second Embodiment

The embodiment relates to a magnetic recording and reproducing device. The magnetic recording and reproducing device includes the magnetic recording medium 80 and the magnetic head according to the first embodiment or a modification of the magnetic head according to the first embodiment. The magnetic recording and reproducing device may include the first circuit portion 10p and the second circuit portion 60p.

Figure 12:
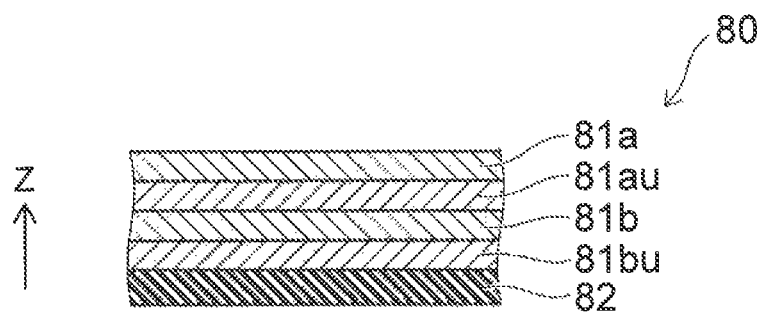
FIG. 12 is a schematic cross-sectional view illustrating the magnetic recording medium.

FIG. 12 is a schematic cross-sectional view illustrating the magnetic recording medium.

As shown in FIG. 12, the magnetic recording medium may include multiple recording layers (a first recording layer 81a, a second recording layer 81b, etc.). A second recording layer 81b is positioned between the medium substrate 82 and a first recording layer 81a. In the example, a first medium under layer 81au is provided between the first recording layer 81a and the second recording layer 81b. A second medium under layer 81bu is provided between the medium substrate 82 and the second recording layer 81b. The stacking direction of the first recording layer 81a and the second recording layer 81b is aligned with the Z-axis direction.

Figure 13:
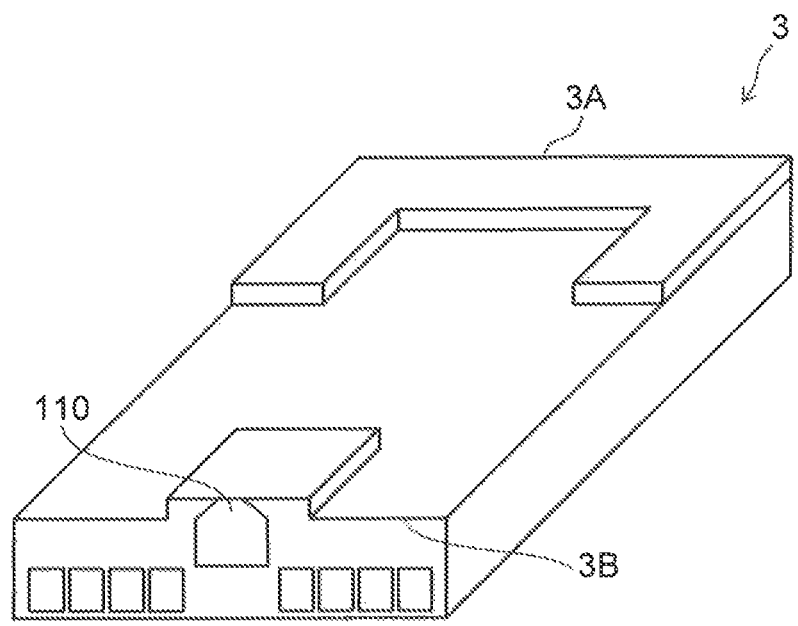
FIG. 13 is a schematic perspective view illustrating a portion of a magnetic recording and reproducing device according to a second embodiment.

FIG. 13 is a schematic perspective view illustrating a portion of the magnetic recording and reproducing device according to the second embodiment.

FIG. 13 illustrates a head slider to which a magnetic head is mounted.

The magnetic head (e.g., the magnetic head 110) is mounted to the head slider 3. The head slider 3 includes, for example, $Al_2O_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic head 110 is disposed at the side surface of the air outflow side 3B of the head slider 3 or the like. Thereby, the magnetic head 110 that is mounted to the head slider 3 moves relative to the magnetic recording medium 80 while flying over or contacting the magnetic recording medium 80.

Figure 14:
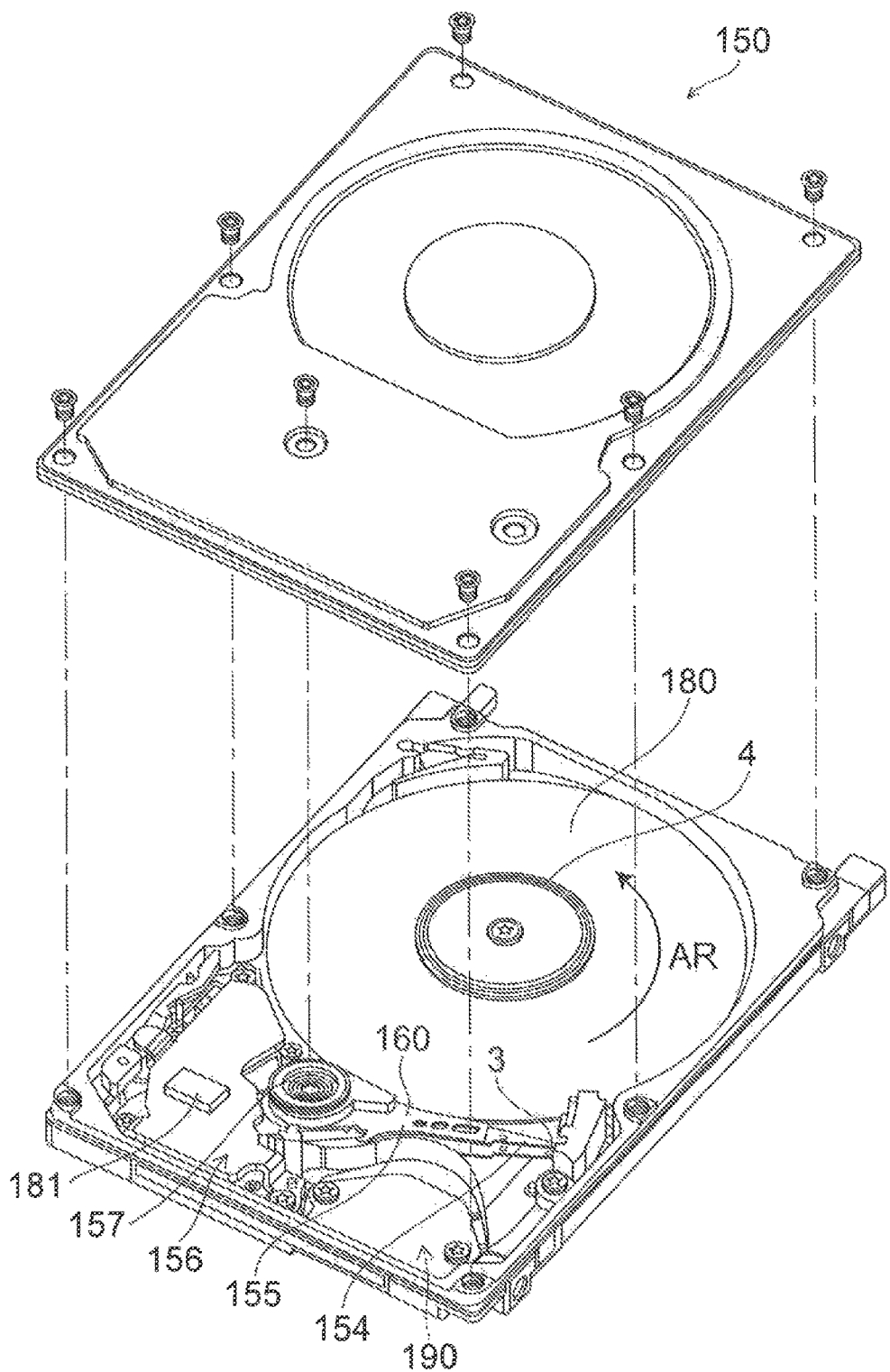
FIG. 14 is a schematic perspective view illustrating the magnetic recording and reproducing device according to the second embodiment.

FIG. 14 is a schematic perspective view illustrating the magnetic recording and reproducing device according to the second embodiment.

Figure 15A:
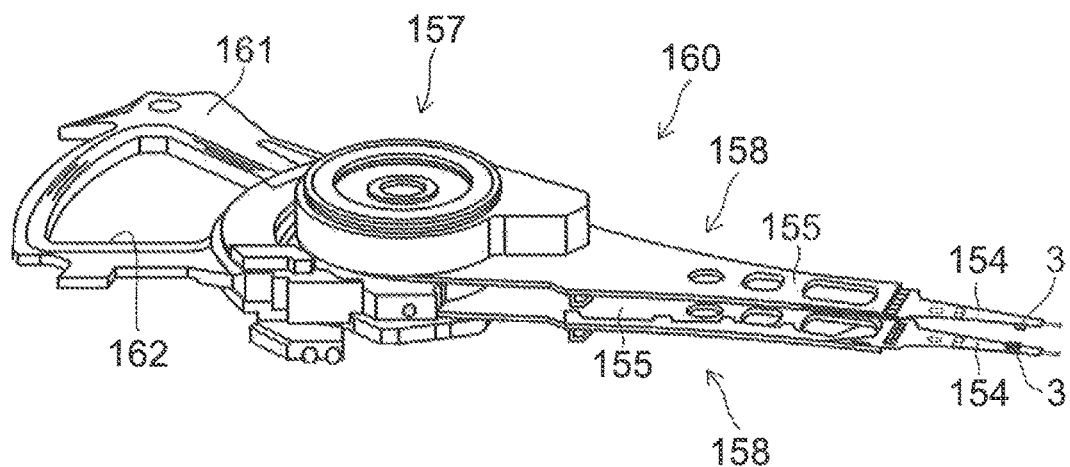
FIG. 15A and FIG. 15B are schematic perspective views illustrating a portion of the magnetic recording and reproducing device according to the second embodiment.
Figure 15B:
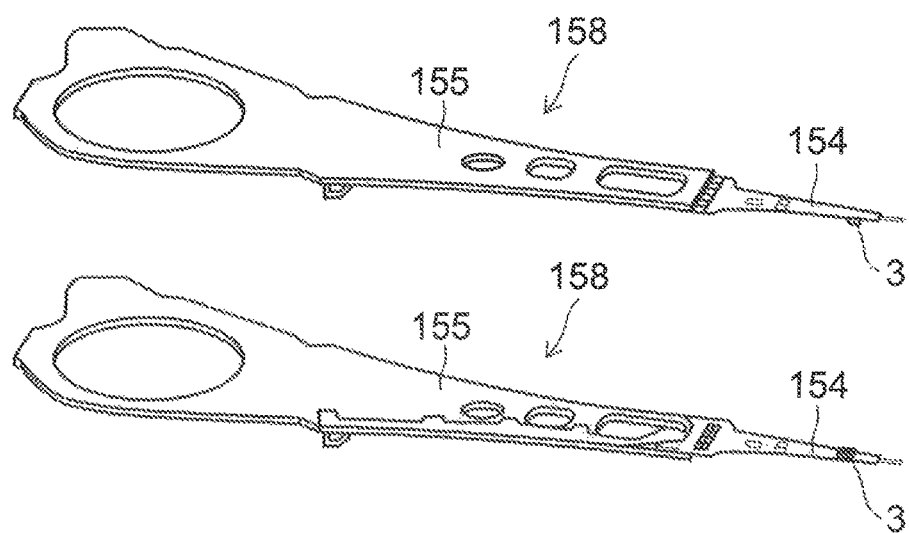

FIG. 15A and FIG. 15B are schematic perspective views illustrating a portion of the magnetic recording and reproducing device according to the second embodiment.

As shown in FIG. 14, a rotary actuator is used in the magnetic recording and reproducing device 150 according to the embodiment. A recording medium disk 180 is mounted to a spindle motor 4. The recording medium disk 180 is rotated in the direction of arrow AR by a motor. The motor responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 3 performs the recording and reproducing of the information recorded in the recording medium disk 180. The head slider 3 is provided at the tip of a suspension 154 having a thin-film configuration. Any of the magnetic heads according to the embodiments is provided at the tip vicinity of the head slider 3.

When the recording medium disk 180 rotates, the downward pressure due to the suspension 154 and the pressure generated by the air bearing surface (the ABS) of the head slider 3 are balanced. The distance between the air bearing surface of the head slider 3 and the surface of the recording medium disk 180 becomes a prescribed fly height. In the embodiment, the head slider 3 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds the drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. A drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can be caused to rotate and slide by the voice coil motor 156. The magnetic head is movable to any position of the recording medium disk 180.

FIG. 15A illustrates a portion of the magnetic recording and reproducing device and is an enlarged perspective view of a head stack assembly 160.

FIG. 15B is a perspective view illustrating a magnetic head assembly (head gimbal assembly (HGA)) 158 which is a portion of the head stack assembly 160.

As shown in FIG. 15A, the head stack assembly 160 includes the bearing part 157, a head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor.

As shown in FIG. 15B, the head gimbal assembly 158 includes the arm 155 that extends from the bearing part 157, and the suspension 154 that extends from the arm 155.

The head slider 3 is provided at the tip of the suspension 154. Any of the magnetic heads according to the embodiments are provided in the head slider 3.

The magnetic head assembly (the head gimbal assembly) 158 according to the embodiment includes the magnetic head according to the embodiment, the head slider 3 in which the magnetic head is provided, the suspension 154, and the arm 155. The head slider 3 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 performs recording and reproducing of the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relatively in a state of being in contact. The position controller aligns the magnetic head at a prescribed recording position of the magnetic recording medium. The signal processor performs the recording and reproducing of the signals to and from the magnetic recording medium for which the magnetic head is used.

For example, the recording medium disk 180 is used as the magnetic recording medium recited above. The movable part recited above includes, for example, the head slider 3. The position controller recited above includes, for example, the head gimbal assembly 158.

The magnetic recording and reproducing device 150 according to the embodiment includes the magnetic recording medium, the magnetic head assembly according to the embodiment, and the signal processor that performs the recording and reproducing of the signals to and from the magnetic recording medium by using the magnetic head provided in the magnetic head assembly.

According to the embodiments, a magnetic head and a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads, and magnetic recording and reproducing devices such as magnetic layers, intermediate layers, magnetic poles, terminals, magnetic recording mediums, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording and reproducing devices practicable by an appropriate design modification by one skilled in the art based on the magnetic heads and the magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
    a first magnetic layer;
    a second magnetic layer separated from the first magnetic layer in a first direction;
    an intermediate layer provided between the first magnetic layer and the second magnetic layer;
    a magnetic pole, a second direction from the first magnetic layer toward the magnetic pole crossing the first direction;
    a first terminal electrically connected to the intermediate layer; and
    a second terminal electrically connected to the second magnetic layer,
    wherein at least a portion of the second magnetic layer does not overlap the magnetic pole in the second direction, and
    wherein an electrical current flowing between the first terminal and the second terminal passes through the intermediate layer and the second magnetic layer, without passing through the first magnetic layer.

2. The head according to claim 1, wherein at least a portion of the intermediate layer does not overlap the magnetic pole in the second direction.

3. The head according to claim 1, wherein
    the magnetic pole has a medium-opposing surface, and
    the first direction and the second direction are aligned with the medium-opposing surface.

4. The head according to claim 1, further comprising a first shield,
    the first magnetic layer being positioned between the magnetic pole and the first shield in the second direction.

5. The head according to claim 4, further comprising a first conductive layer provided between the first shield and the intermediate layer,
    the first shield being electrically connected to the intermediate layer,
    the first terminal being electrically connected to the first shield.

6. The head according to claim 4, further comprising a second conductive layer provided between the first shield and the second magnetic layer,
    the first shield being electrically connected to the second magnetic layer,
    the second terminal being electrically connected to the first shield.

7. The head according to claim 1, further comprising a second shield,
    a third direction from the second shield toward the first magnetic layer crossing the second direction.

8. The head according to claim 7, wherein the third direction is aligned with the first direction.

9. The head according to claim 7, wherein the third direction crosses a plane formed by the first direction and the second direction.

10. A magnetic recording and reproducing device, comprising:
    the magnetic head according to claim 7; and
    a magnetic recording medium,
    the second shield opposing at least a portion of a first region when the magnetic pole performs recording to a second region of the magnetic recording medium after the magnetic pole has performed recording to the first region of the magnetic recording medium,
    a portion of the second region overlaps the first region.

11. The head according to claim 1, wherein a stacked body includes the first magnetic layer, the intermediate layer, and the second magnetic layer, and the stacked body generates an oscillating magnetic field when a current flows between the first terminal and the second terminal.

12. A magnetic recording and reproducing device, comprising:
    the magnetic head according to claim 1; and
    a magnetic recording medium.

13. The device according to claim 12, further comprising a first circuit portion configured to supply a current to the first terminal and the second terminal.

14. The device according to claim 12, further comprising a second circuit portion,
    the magnetic head further including a coil,
    at least a portion of the coil being in at least a portion of a region around the magnetic pole,
    the second circuit portion being configured to supply a recording current to the coil.

15. A magnetic head, comprising:
    a first magnetic layer;
    a second magnetic layer separated from the first magnetic layer in a first direction;
    an intermediate layer provided between the first magnetic layer and the second magnetic layer;
    a magnetic pole, a second direction from the first magnetic layer toward the magnetic pole crossing the first direction;
    a first terminal electrically connected to the intermediate layer; and
    a second terminal electrically connected to the second magnetic layer,
    wherein at least a portion of the intermediate layer does not overlap the magnetic pole in the second direction, and
    wherein an electrical current flowing between the first terminal and the second terminal passes through the intermediate layer and the second magnetic layer, without passing through the first magnetic layer.

* * * * *